(12) United States Patent
Ando et al.

(10) Patent No.: US 7,815,028 B2
(45) Date of Patent: Oct. 19, 2010

(54) CLUTCH PLATE, FRICTION CLUTCH, AND COUPLING DEVICE

(75) Inventors: Junji Ando, Kariya (JP); Naoyuki Sakai, Kariya (JP); Toshifumi Sakai, Kariya (JP); Hajime Fukami, Kariya (JP); Toshiyuki Saito, Kariya (JP); Koji Nishi, Kariya (JP); Kazuyuki Nakanishi, Seto (JP); Hiroyuki Mori, Nisshin (JP); Hideo Tachikawa, Nisshin (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 10/404,347

(22) Filed: Apr. 2, 2003

(65) Prior Publication Data

US 2003/0217904 A1 Nov. 27, 2003

(30) Foreign Application Priority Data

May 24, 2002 (JP) ............................. 2002-151264

(51) Int. Cl.
*F16D 27/115* (2006.01)
*F16D 27/12* (2006.01)
*F16D 13/74* (2006.01)

(52) U.S. Cl. ................... 192/35; 192/70.12; 192/70.14; 192/84.7; 192/84.91; 192/113.36

(58) Field of Classification Search ................... 192/35, 192/70.12, 70.14, 84.7, 84.91, 107 M, 113.36
See application file for complete search history.

(56) References Cited

U.S. PATENT DOCUMENTS

| | | |
|---|---|---|
| 3,073,424 A | 1/1963 | Russell |
| 4,516,443 A | 5/1985 | Hamano et al. |
| 4,988,421 A * | 1/1991 | Drawl et al. ............. 204/192.3 |
| 5,198,285 A | 3/1993 | Arai et al. |
| 5,205,188 A | 4/1993 | Repenning et al. |

(Continued)

FOREIGN PATENT DOCUMENTS

EP 0 856 676 8/1998

(Continued)

OTHER PUBLICATIONS

D. Sheeja, et al., Wear 249, pp. 433-439, "Tribological Properties and Adhesive Strength of DLC Coatings Prepared Under Different Substrate Bias Voltages", 2001.

(Continued)

*Primary Examiner*—Richard M. Lorence
(74) *Attorney, Agent, or Firm*—Oblon, Spivak, McClelland, Maier & Neustadt, L.L.P.

(57) ABSTRACT

A friction clutch includes an iron inner clutch plate and two iron outer clutch plates. Each clutch plate has a sliding surface that friction-engages with the other clutch plates. A diamond-like carbon film containing silicon, which functions as a solid lubricant, is formed on the sliding surface of each outer clutch plate through a conventional method such as plasma chemical vapor deposition. The diamond-like carbon film contains 1 wt % to 80 wt % of silicon. A coupling device includes a pilot clutch mechanism that has the friction clutch and an electromagnetic actuator. As a result, the friction clutch has an improved resistance to wear, and the coupling device is durable.

24 Claims, 5 Drawing Sheets

U.S. PATENT DOCUMENTS

| | | | |
|---|---|---|---|
| 5,411,758 A | 5/1995 | Simpson | |
| 5,452,784 A | 9/1995 | Miyoshi et al. | |
| 5,584,776 A | 12/1996 | Wellant et al. | |
| 5,651,430 A | 7/1997 | Rancourt et al. | |
| 6,001,480 A * | 12/1999 | Sho | 428/408 |
| 6,006,869 A | 12/1999 | Rancourt et al. | |
| 6,077,607 A | 6/2000 | Zornik | |
| 6,136,386 A * | 10/2000 | Nakahigashi et al. | 427/536 |
| 6,158,561 A * | 12/2000 | Sakai et al. | 192/35 |
| 6,165,616 A * | 12/2000 | Lemelson et al. | 428/408 |
| 6,358,565 B1 | 3/2002 | Krenkel et al. | |
| 6,427,817 B1 | 8/2002 | Arai et al. | |
| 6,652,969 B1 * | 11/2003 | Murakami et al. | 428/408 |
| 6,719,115 B2 * | 4/2004 | Rogner et al. | 192/85 CA |
| 6,920,968 B2 | 7/2005 | Sakai et al. | |
| 2003/0217904 A1 | 11/2003 | Ando et al. | |

FOREIGN PATENT DOCUMENTS

| | | |
|---|---|---|
| EP | 0961038 | 12/1999 |
| EP | 1150004 A2 * | 10/2001 |
| EP | 1 178 233 | 2/2002 |
| EP | 1323942 A1 | 7/2003 |
| GB | 1263234 | 2/1972 |
| JP | 55-51127 | 4/1980 |
| JP | 1-145438 | 6/1989 |
| JP | 01-261523 | 10/1989 |
| JP | 03 292385 | 12/1991 |
| JP | 3-292385 | 12/1991 |
| JP | 05-065927 | 3/1993 |
| JP | 05-055732 | 8/1993 |
| JP | 06-074389 | 9/1994 |
| JP | 10-130817 | 5/1998 |
| JP | 11-217167 | 8/1999 |
| JP | 11-287258 | 10/1999 |
| JP | 11-294488 | 10/1999 |
| JP | 11-310868 | 11/1999 |
| JP | 2000-310244 | 11/2000 |
| JP | 2001-65599 | 3/2001 |
| JP | 2002-070894 | 3/2002 |

OTHER PUBLICATIONS

U.S. Appl. No. 10/290,146, filed Nov. 8, 2002, Sakai et al.
U.S. Appl. No. 10/649,730, filed Aug. 28, 2003, Ando et al.
U.S. Appl. No. 12/089,214, filed Apr. 4, 2008, Ando, et al.

* cited by examiner

CLUTCH PLATE, FRICTION CLUTCH, AND COUPLING DEVICE

CROSS-REFERENCE TO RELATED APPLICATIONS

This application is based upon and claims the benefit of priority from prior Japanese Patent Application No. 2002-151264, filed on May 24, 2002, the entire contents of which are incorporated herein by reference.

BACKGROUND OF THE INVENTION

The present invention relates to a clutch plate and a friction clutch used in, for example, a coupling device of a vehicle.

A typical friction clutch includes a drive clutch plate and a driven clutch plate, which friction-engage with each other to transmit power.

Surface treatment is applied onto sliding surfaces of both clutch plates to retard wear due to friction. The surface treatment includes, for example, nitride treatment, or quenching and tempering treatment. Wear of the sliding surfaces is reduced by reinforcing the sliding surfaces of both clutch plates by these surface treatments.

However, even in the case in which the surface treatment as describe above is applied, if both clutch plates are friction-engaged in the state without lubricant oil, or if a great power is transmitted even in the friction engagement with the lubricant oil, the sliding surfaces wear significantly, and the clutch plates have less durability.

BRIEF SUMMARY OF THE INVENTION

An objective of the present invention is to provide a clutch plate that is resistant to wear and excellent in durability. Another objective of the present invention is to provide a friction clutch and a coupling device that have such clutch plates.

To achieve the above objective, the present invention provides a clutch plate having a sliding surface that contacts another clutch plate. A diamond-like carbon film containing silicon is formed on the sliding surface.

The present invention also provides a friction clutch having a first clutch plate and a second clutch plate. The first clutch plate has a first sliding surface. The second clutch plate has a second sliding surface that contacts the first sliding surface. The clutch plates friction-engage with each other to transmit torque. A diamond-like carbon film containing silicon is formed on at least one of the first and second sliding surfaces.

The present invention further provides a coupling device having a first rotary member, a second rotary member, a housing chamber, and a plurality of clutches. The second rotary member is rotatable relative to the first rotary member. The housing chamber is defined between the first rotary member and the second rotary member. The clutches are located in the housing chamber. The clutches cooperate to transmit torque between the first rotary member and the second rotary member. At least one of the clutches is a friction clutch having a first clutch plate and a second clutch plate. The clutch plates friction-engage with each other. The first clutch plate has a first sliding surface that contacts the second clutch plate. The second clutch plate has a second sliding surface that contacts the first clutch plate. A diamond-like carbon film containing silicon is formed on at least one of the first and second sliding surfaces.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 9.

Figure 2:
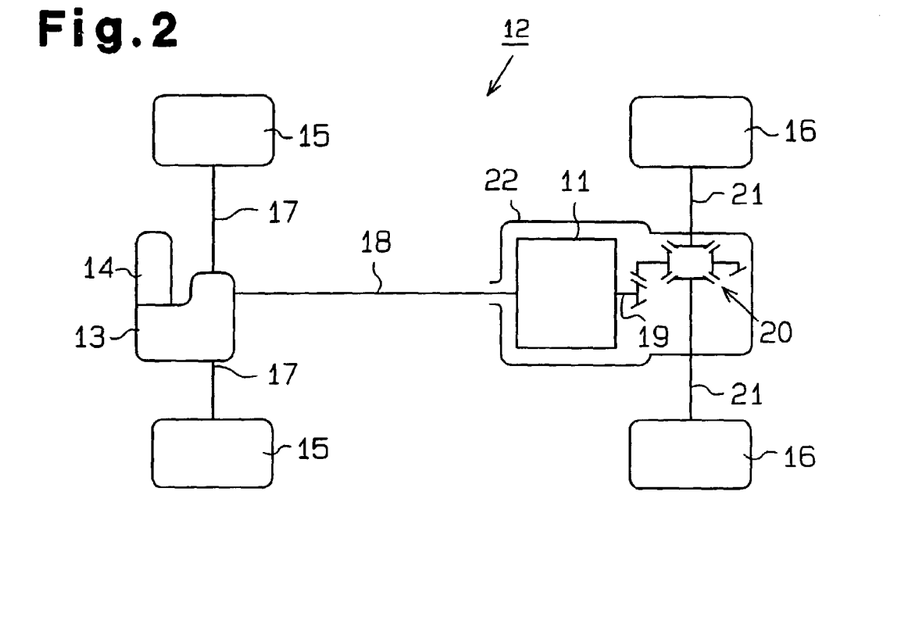
FIG. 2 is a view schematic diagram showing a four-wheel drive car loaded with the coupling device in FIG. 1.

As shown in FIG. 2, a four-wheel drive vehicle 12 includes a coupling device 11, a trans-axle 13, an engine 14, a pair of front wheels 15, and a pair of rear wheels 16. Power of the engine 14 is transmitted to the front wheels 15 via the trans-axle 13 and a pair of axle shafts 17.

The coupling device 11 is provided on a power transmission route between the engine 14 and the rear wheels 16. Namely, the coupling device 11 is connected to the trans-axle 13 via a propeller shaft 18. A rear differential 20 is connected to the coupling device 11 via a drive pinion shaft 19. The rear wheels 16 are connected to the rear differential 20 via a pair of axle shafts 21. The coupling device 11 selectively permits and shuts off the transmission of torque from the propeller shaft 18 to the drive pinion shaft 19.

The coupling device 11 and the rear differential 20 are housed in a differential carrier 22 and are supported by the carrier 22. The differential carrier 22 is supported by a vehicle body of the four-wheel drive vehicle 12.

Figure 1:
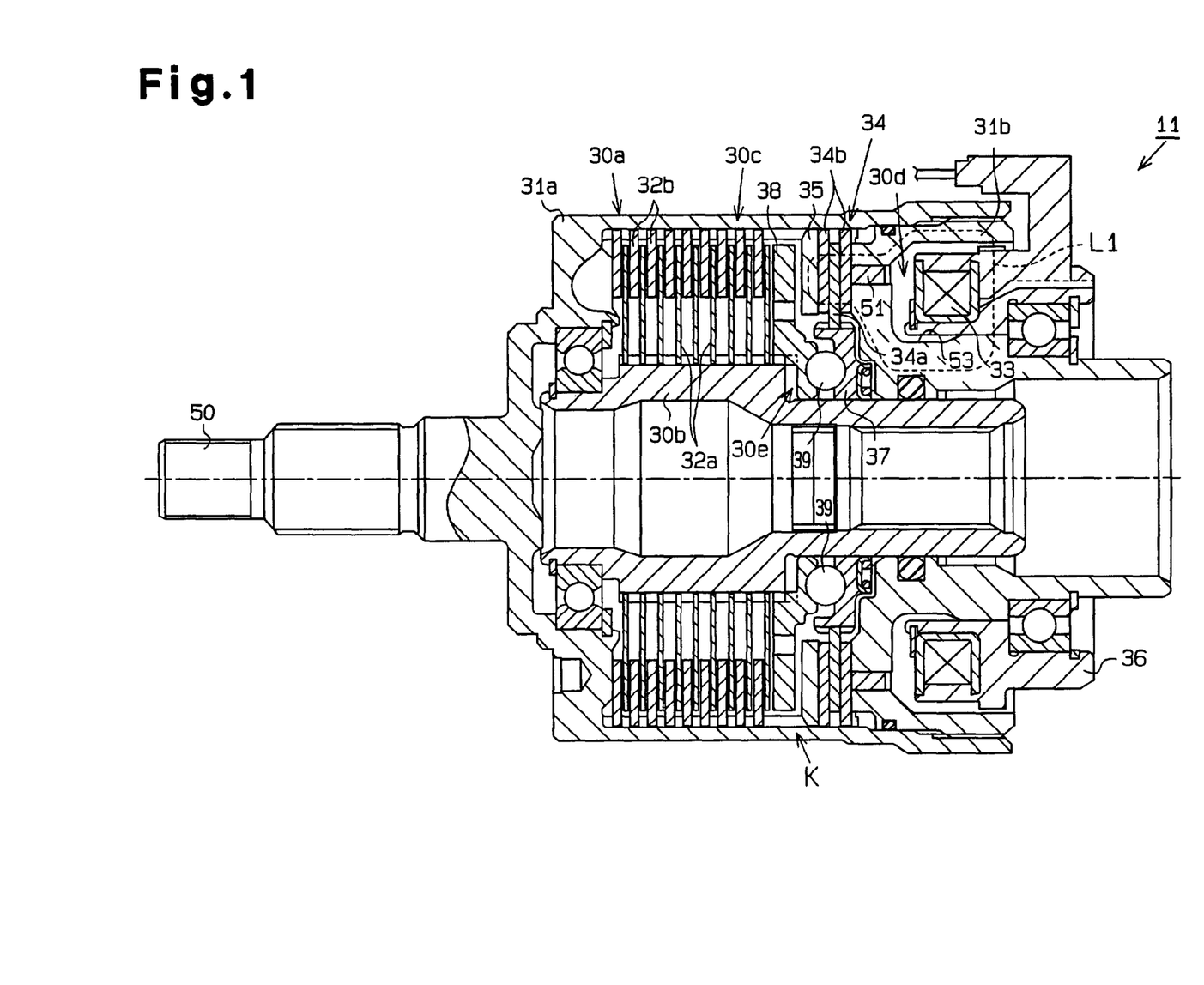
FIG. 1 is a cross-sectional view showing a coupling device according to a first embodiment of the present invention.

As shown in FIG. 1, the coupling device 11 includes an outer case 30a (first rotary member), an inner shaft 30b (second rotary member), a main clutch mechanism 30c, a pilot clutch mechanism 30d, and a cam mechanism 30e.

The outer case 30a includes a closed-end cylindrical front housing 31a and a rear housing 31b screwed into the front housing 31a so as to be placed over a rear end opening part of the front housing 31a. An input shaft 50 protrudes from a front end of the front housing 31a. The input shaft 50 is connected to the propeller shaft 18 (see FIG. 2).

The front housing 31a and the rear housing 31b are formed of iron (a magnetic material). A ring body 51 formed of stainless steel (a non-magnetic material) is embedded in a middle part of the rear housing 31b in the radial direction.

As shown in FIG. 1, a space enclosed by the front housing 31a, the rear housing 31b, the inner shaft 30b, and the ring body 51 forms a housing chamber K.

An outer circumference part of the front housing 31a in the vicinity of the front end is supported rotatably with respect to the differential carrier 22 (see FIG. 2) via a bearing (not shown). The rear housing 31b is supported rotatably with respect to a yoke 36, which is supported by the differential carrier 22 (see FIG. 2), via a bearing. A rear side cylindrical part of the rear housing 31b is supported rotatably with respect to the differential carrier 22 (see FIG. 2) with an oil seal (not shown) in between.

The inner shaft 30b penetrates through a central part of the rear housing 31b to be inserted into the front housing 31a. A gap between the inner shaft 30b and the rear housing 31b is sealed. The inner shaft 30b is supported rotatably with respect to the front housing 31a and the rear housing 31b with its movement in the axial direction being restricted. A tip end portion of the drive pinion shaft 19 (see FIG. 2) is fitted into the inner shaft 30b. The drive pinion shaft 19 is not shown in FIG. 1.

As shown in FIG. 1, the main clutch mechanism 30c is a wet type clutch mechanism, and includes a plurality of iron inner clutch plates 32a and a plurality of iron outer clutch plates 32b. A wet type friction material with cellulosic fibers as a base material is stuck on both side surfaces (both sliding surfaces) of each of the inner clutch plates 32a. Consequently, when the adjacent inner clutch plate 32a and outer clutch plate 32b are engaged with each other, the materials of the plates 32a and 32b, namely, the iron materials are not directly in sliding contact with each other. Thus, particles caused by wear of iron hardly occur.

These clutch plates 32a and 32b are placed near a back wall of the front housing 31a. The inner clutch plates 32a are mounted to an outer circumference of the inner shaft 30b by spline fitting, and are movable in the axial direction with respect to the inner shaft 30b.

The outer clutch plates 32b are mounted to an inner circumference of the front housing 31a by spline fitting, and are movable in the axial direction with respect to the front housing 31a. The inner clutch plates 32a and the outer clutch plates 32b are alternately placed. The adjacent inner clutch plate 32a and outer clutch plate 32b are capable of moving closer to each other and away from each other in the axial direction.

The pilot clutch mechanism 30d includes an annular electromagnet 33, a first clutch, and an armature 35. In this embodiment, the first clutch is a friction clutch 34. The electromagnet 33 and armature 35 construct an electromagnetic actuator. The electromagnet 33 is fitted in the yoke 36. Part of the yoke 36 and the electromagnet 33 are housed in an annular recess 53 formed in the rear housing 31b.

The friction clutch 34 includes an iron inner clutch plate 34a and two iron outer clutch plates 34b. The inner clutch plate 34a is mounted to an outer circumference of a first cam member 37 constructing part of the cam mechanism 30e by spline fitting, and is movable in the axial direction with respect to the first cam member 37. Meanwhile, the outer clutch plates 34b are mounted to the inner circumference of the front housing 31a by spline fitting, and are movable in the axial direction with respect to the front housing 31a.

The inner clutch plate 34a and the outer clutch plates 34b are alternately placed. The adjacent inner clutch plate 34a and outer clutch plate 34b are able to move closer to and away from each other in the axial direction.

As shown in FIG. 1, the armature 35 forming a ring shape is mounted to the inner circumference of the front housing 31a by spline fitting, and is movable in the axial direction with respect to the front housing 31a. The armature 35 is located at one side of the friction clutch 34, and opposes the friction clutch 34.

The electromagnet 33 forms a magnetic path L1 circulating through the yoke 36, the rear housing 31b, the friction clutch 34, the armature 35, the friction clutch 34, the rear housing 31b and the yoke 36 when electric current is supplied.

As shown in FIG. 1, the cam mechanism 30e includes the first cam member 37, a second cam member 38 and a plurality of ball-shaped cam followers 39. The first cam member 37 and the second cam member 38 form substantially a disk shape.

The first cam member 37 is rotatably fitted about the inner shaft 30b and is rotatably supported by the rear housing 31b. The first cam member 37 and the armature 35 rotate relative to each other.

The second cam member 38 is mounted to the outer circumference of the inner shaft 30b by spline fitting and is movable in the axial direction with respect to the inner shaft 30b, and rotates integrally with the inner shaft 30b. The second cam member 38 faces the main clutch mechanism 30c.

The first cam member 37 has a plurality of cam grooves which are placed on the same circle and each placed to be spaced by a predetermined angle, on the surface facing the second cam member 38. The second cam member 38 similarly has a plurality of cam grooves which are placed on the same circle and each placed to be spaced by a predetermined angle, on the surface opposing the first cam member 37. Each of the cam followers 39 is placed between the cam members 37 and 38, and is held by one of the cam grooves on the first cam member 37 and the corresponding cam groove on the second cam member 38.

Each cam followers 39 allows relative rotation of both the cam members 37 and 38 only within the range of the circumferential length of both of the corresponding cam grooves. Each of the cam followers 39 presses the second cam member 38 in a direction to move away from the first cam member 37, namely, in a direction toward the main clutch mechanism 30c by the action of both the corresponding cam grooves following the relative rotation of both the cam members 37 and 38.

The armature 35 and the electromagnet 33 are placed to sandwich the friction clutch 34 and the rear housing 31b between them. The rear housing 31b functions as a magnet path forming member.

The housing chamber K is filled with lubricant oil for lubricating the clutch plates 32a, 32b, 34a, and 34b.

When an electric current is not supplied to the electromagnet 33 of the pilot clutch mechanism 30d, an electromagnetic attraction force does not occur between the electromagnet 33 and the armature 35. As a result, the friction clutch 34 is not held by the rear housing 31b and the armature 35, and the adjacent inner clutch plate 34a and outer clutch plate 34b are in the state in which they are released from the friction engagement (non-engaging state of the friction clutch 34). In this state, the friction clutch 34 does not transmit torque to the first cam member 37 from the front housing 31a, and the cam mechanism 30e does not function to press the second cam member 38 in the direction to the main clutch mechanism 30c. As a result, the main clutch mechanism 30c is in a non-engaging state in which the torque transmission to the inner shaft 30b from the front housing 31a is shut off, and the power of the engine 14 is not transmitted to both the rear wheels 16. Accordingly, the four-wheel drive vehicle 12 is driven in a two-wheel drive mode in which only both the front wheels 15 are driven by the engine 14.

Meanwhile, when an electric current is supplied to the electromagnet 33, the electromagnetic attraction force occurs between the electromagnet 33 and the armature 35. Consequently, the friction clutch 34 is held by the rear housing 31b and the armature 35, and both the adjacent clutch plates 34a and 34b are engaged by friction with each other (the engaging state of the friction clutch 34). In this state, the friction clutch 34 allows torque transmission to the first cam member 37 from the front housing 31a, and the first cam member 37 rotates with the front housing 31a. Thereupon, relative rotation occurs between the first cam member 37 and the second cam member 38, and the cam mechanism 30e functions to press the second cam member 38 in the direction toward the main clutch mechanism 30c.

As a result, both the adjacent clutch plates 32a and 32b are engaged with each other by friction and the main clutch mechanism 30c is in the engaging state which allows the torque transmission from the front housing 31a to the inner shaft 30b. Accordingly, the power of the engine 14 is transmitted to both the rear wheels 16 and the four-wheel drive vehicle 12 is driven in a four-wheel drive mode.

The torque transmission rate from the front housing 31a to the inner shaft 30b is determined according to the electromagnetic attraction force occurring between the electromagnet 33 and the armature 35, in other words, the frictional force between both the adjacent clutch plates 34a and 34b in the friction clutch 34. The electromagnetic attraction force can be adjusted by controlling the applied current to the electromagnet 33.

By increasing the applied current to the electromagnet 33 to a predetermined value, the electromagnetic attraction force occurring between the electromagnet 33 and the armature 35 increases to the extent which does not allow the friction clutch 34 to slide. As a result, the cam mechanism 30e increases the force to press the second cam member 38 in the direction to move to the main clutch mechanism 30c, so that slide does not occur to the main clutch mechanism 30c. Accordingly, the outer case 30a and the inner shaft 30b are integrally rotated, and the torque transmission rate from the outer case 30a to the inner shaft 30b becomes 100%. Consequently, the power of the engine 14 is equally transmitted to the front wheels 15 and the rear wheels 16.

Figure 3:
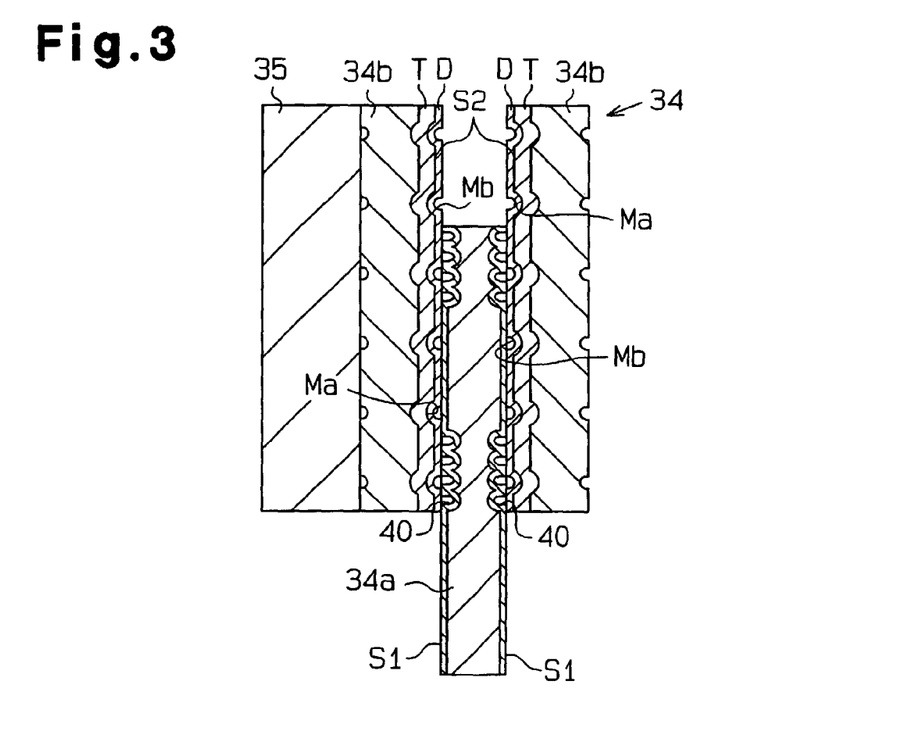
FIG. 3 is a cross-sectional view showing inner clutch plates and outer clutch plates included in the coupling device in FIG. 1.

As shown in FIG. 3, the inner clutch plate 34a has a pair of sliding surfaces S1 formed at both sides. Each sliding surface S1 faces one of the two outer clutch plates 34b. Each outer clutch plate 34b has a sliding surface S2 that faces the inner clutch plate 34a.

Figure 4:
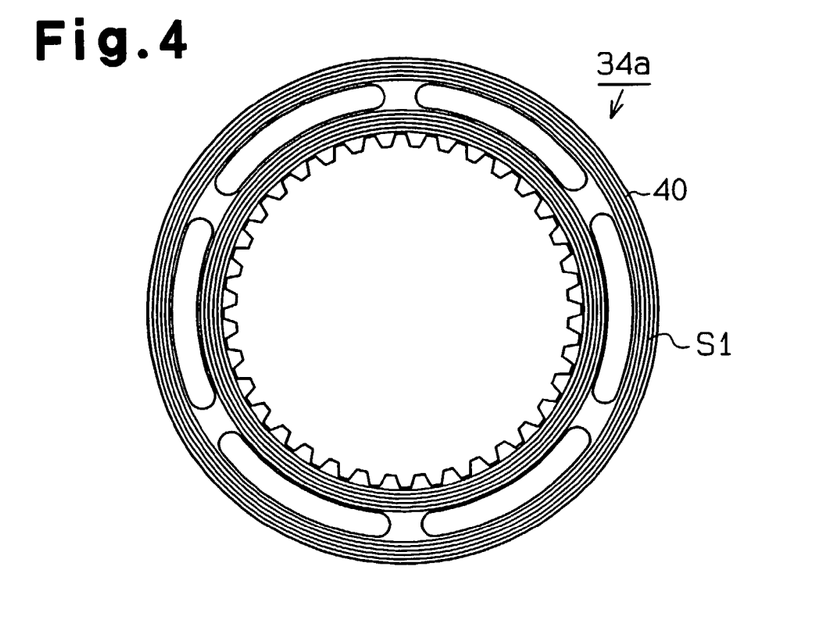
FIG. 4 is a front view showing the inner clutch plate in FIG. 3.

As shown in FIG. 3 and FIG. 4, a number of annular grooves 40 having very small width are formed with a very small pitch on each of the sliding surfaces Si by press working. Known nitride treatment or known quenching and tempering treatment is applied to each of the sliding surfaces S1. These annular grooves 40 are illustrated to be larger than as they are for purposes of illustration. The actual pitch and height of the groove 40 is only several μm.

Figure 5:
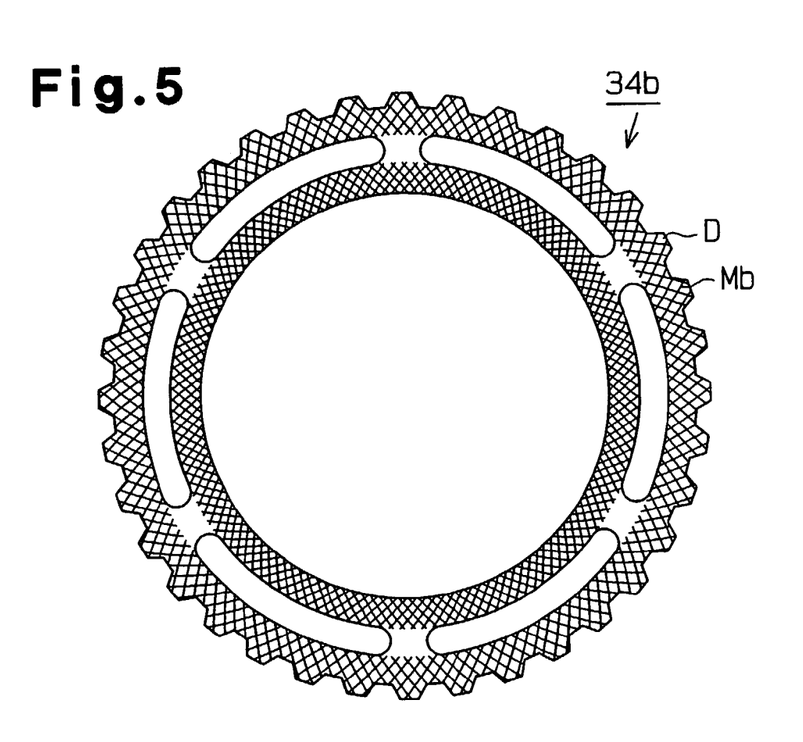
FIG. 5 is a front view showing one of the outer clutch plates shown-in FIG. 3.

As shown in FIGS. 3 and 5, grooves Ma forming mesh-like pattern are formed on the sliding surface S2 of each outer clutch plate 34b that faces the inner clutch plate 34a. The grooves Ma have a width of approximately 0.3 mm.

The sliding surfaces S2 having the grooves Ma include a nitrided layer T, which is formed by nitriding the sliding surface S2. On the surface of the nitrided layer T, a diamond-like carbon film (DLC-Si film) D containing silicon is formed. A great number of minute asperities are formed on the surface of the nitrided layer T by ion impact sputtering. The asperities improve the contact of the DLC-Si film D to the nitrided layer T.

The thickness of the nitrided layer T is preferably in a range from 10 μm to 600 μm, more preferably in a range from 50 μm to 400 μm, and most preferably in a range from 100 μm to 300 μm. The thickness of the nitrided layer T includes the thickness of an imperfect nitrided layer formed by diffusion during nitriding. If the thickness of the nitrided layer T is in a range from 10 μm to 600 μm, the asperities are favorably formed by ion impact sputtering. In this embodiment, the thickness of the nitrided layer T is 200 μm.

The DLC-Si film D, or the diamond-like carbon film, is also referred to as amorphous rigid carbon film. Therefore, the diamond-like carbon film is an amorphous carbon film.

The hardness of the DLC-Si film D rending carbon film is approximately 2000 Hv. The thickness of the DLC-Si film D is in a range from 0.1 μm to 10 μm, and preferably in a range from 1 μm to 5 μm, so that the sliding surfaces S2 are effectively protected. If the thickness is less than 0.1 μm, the life of the film D against wear will be shortened, the film D will not be practical. If the thickness surpasses 10 μm, the DLC-Si film D will be too brittle. In this embodiment, the thickness of the DLC-Si film D is 3 μm.

In the DLC-SI film D, the ratio of silicon to the diamond-like carbon is in a range from 1 wt % to 80 wt %, preferably in a range from 5 wt % to 50 wt %, and more preferably in a range from 10 wt % to 40 wt %. If the ratio is less than 1 wt %, the DLC-Si film D will be unsatisfactory. If the ratio is more than 80 wt %, the sliding surfaces S1 of the inner clutch plates 34a that contact the DLC-Si film D will be liable to be worn. If the ratio is less than 10 wt %, soot is likely to be created when the DLC-Si film D is formed on the surface of the outer clutch plates 34b.

A mesh-like grooves Mb are formed on the DLC-Si film D to correspond to the grooves Ma on the nitrided layer T. The grooves Mb receives excessive lubricant oil between the outer clutch plate 34b and the inner clutch plate 34a.

The outer clutch plates 34b are formed through a method disclosed in Japanese Laid-Open Patent Publications No. 10-130817 or No. 11-310868. The manufacturing method will be briefly described.

First, the sliding surface S2 of each outer clutch plate 34b having the grooves Ma is nitrided so that the nitrided layer T is formed. Then, the surface of the nitrided layer T is subjected to ion impact sputtering using an inert gas such as helium and argon gas, or a cleaning gas such as hydrogen gas. As a result, the asperities (not shown) are formed on the surface of the nitrided layer T. The asperities improve the adhering force of the DLC-Si film D with respect to the surface of the nitrided layer T.

Thereafter, the DLC-Si film D is formed on the surface of the nitride layer T having the asperities through ion plating, sputtering, vacuum deposition, or plasma chemical vapor deposition. The ion plating includes arc method and hollow cathode method. When the DLC-Si film D is formed, the grooves Mb are formed in part of the DLC-Si film D that corresponds to the grooves Ma on the nitrided layer T.

Next, the result of the comparison between the coupling device 11 and a first example coupling device A and a second example coupling device B will be described. The first and second example coupling devices A, B are different from the coupling device 11 of this embodiment in the following points. That is, the outer clutch plates 34b of the first example coupling device A have nitrided layers T but no DLC-Si films D. However, the ion impact sputtering is not applied to the nitrided layer T. Thus, unlike this embodiment, no asperities are formed on the nitrided layer T. On the other hand, the outer clutch plates 34b of the second example coupling device B have nitrided layers T, and the asperities are formed on each nitrided layer T through ion impact sputtering. However, on each outer clutch plate 34b of the second example coupling device B, a diamond-like carbon film containing no silicon is formed instead of the DLC-Si flim D of this embodiment. The torque transmission capacity of the example coupling devices A, B is the same as that of the coupling device 11.

Figure 6:
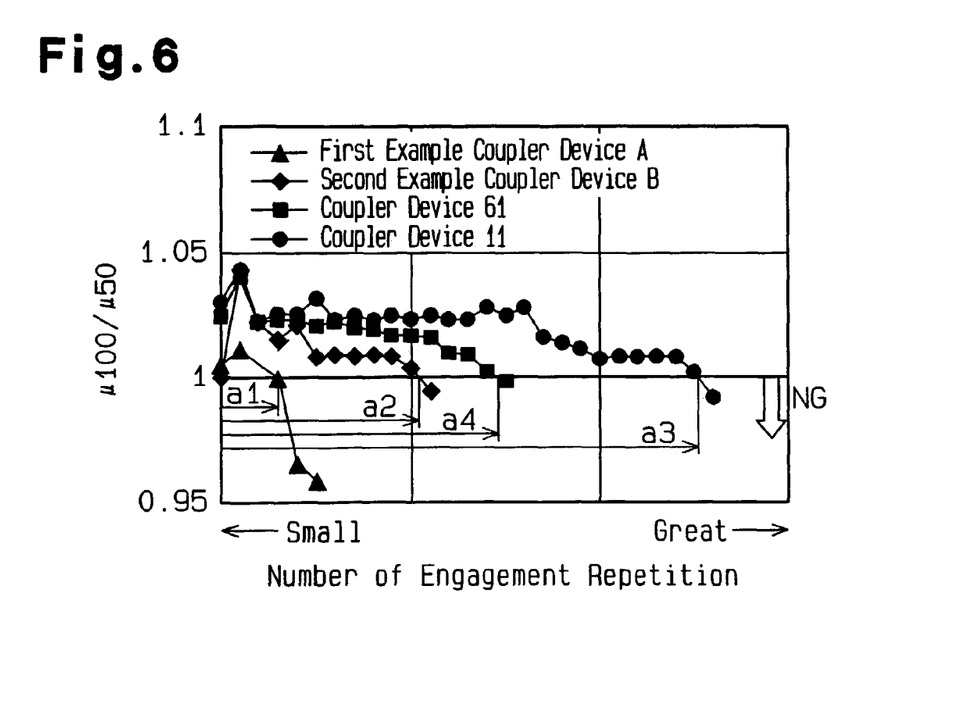
FIG. 6 is a graph showing the relationship between the number of engagement repetition and μ100/μ50 in the first and second embodiments.

FIG. 6 is a graph showing the relationship between the number of engagement repetition and $\mu 100/\mu 50$ in each of the coupling devices 11, A, and B. In the graph of FIG. 6, the vertical axis represents $\mu 100/\mu 50$, and the horizontal axis represents the number of engagement repetition. The number of engagement repetition is a number that is incremented by one every time any adjacent pair of the clutch plates in a friction clutch engages.

$\mu 100/\mu 50$ shows the value obtained by dividing the friction coefficient $\mu$, which is obtained when the inner shaft is rotated at the rotational frequency v of 100 $\min^{-1}$ (rpm), by the friction coefficient $\mu$, which is obtained when the same inner shaft is rotated at the rotational frequency v of 50 $\min^{-1}$ (rpm) in the state where the outer case is fixed.

The fact that the value of $\mu 100/\mu 50$ is 1 or more means that the larger the rotational frequency v, the larger the friction coefficient p. This is called that the $\mu$-v property has positive dependence on rotation speed, or is positive gradient. When the $\mu$-v property is positive gradient, it is generally known that the judder is favorably prevented.

The judder refers to a phenomenon in which the self-excited oscillation, which generated due to the stick slip at the sliding portion of the inner clutch plate 34a and the outer clutch plate 34b or at the sliding portion of the inner clutch plate 32a and the outer clutch plate 32b, spreads to the entire vehicle on which the coupling device is mounted.

In order to reduce the stick slip, it is effective that the dependence of the friction coefficient $\mu$ with respect to the relative rotational frequency v between both the adjacent clutch plates exist, namely, that the $\mu$-v property be a positive gradient. When the $\mu$-v property is a positive gradient, $d\mu/dv$ is 0 or more.

The frictional force occurring between both the adjacent clutch plates is constituted by the sum of the a fluid friction force (shearing resistance force of the oil film) and the boundary friction force (frictional force caused by contact of both the clutch plates), and the magnitude of the friction forces per unit area is in the relationship of the fluid friction force << the boundary friction force. If the relative rotational frequency v becomes greater, the formation of the oil film is promoted, and the fluid friction force increases while the boundary friction force decreases. If the roughness of the contact surface of both the clutch plates is large, the contact of the raised portions of both the contact surfaces is maintained even if the relative rotational frequency v increases. In this case, the decrease in the boundary friction force is suppressed, the increase in the fluid friction force is suppressed, and the $\mu$-v property tends to be a positive gradient.

As the height irregularities of the clutch plates 32a, 32b, 34a, and 34b are lowered, stick slip is more likely to occur. As the amount of abrasion particles of the clutch plates 32a, 32b, 34a, and 34b mixed with the lubricant oil increases, stick slip is more likely to occur.

As shown in FIG. 6, in the case of the first example coupling device A, if the number of engagement repetition exceeds a1, $\mu 100/\mu 50$ is less than one and the judder occurs. This judder is due to wear of the clutch plates in the friction clutch. The occurrence of judder means that the lifetime of the coupling device A has expired.

On the other hand, in the cases of the second example coupling device B, if the number of engagement repetition exceeds a2, $\mu 100/\mu 50$ is less than one and the judder occurs. At this time, the lifetime of the second example coupling device B is expired.

On the other hand, in the cases of the coupling device 11 according to this embodiment, if the number of engagement repetition exceeds a3, respectively, $\mu 100/\mu 50$ is less than one and the judder occurs. At this time, the lifetime of the coupling device 11 is expired.

As obvious from the graph of FIG. 6, in the case of the coupling device 11, which has the outer clutch plates 34b on which the DLC-Si films D are formed, the number of engagement repetition until judder occurs is 8.5 times and 2.5 times the corresponding number of engagement repetition of the coupling devices A, B, respectively.

Figure 7:
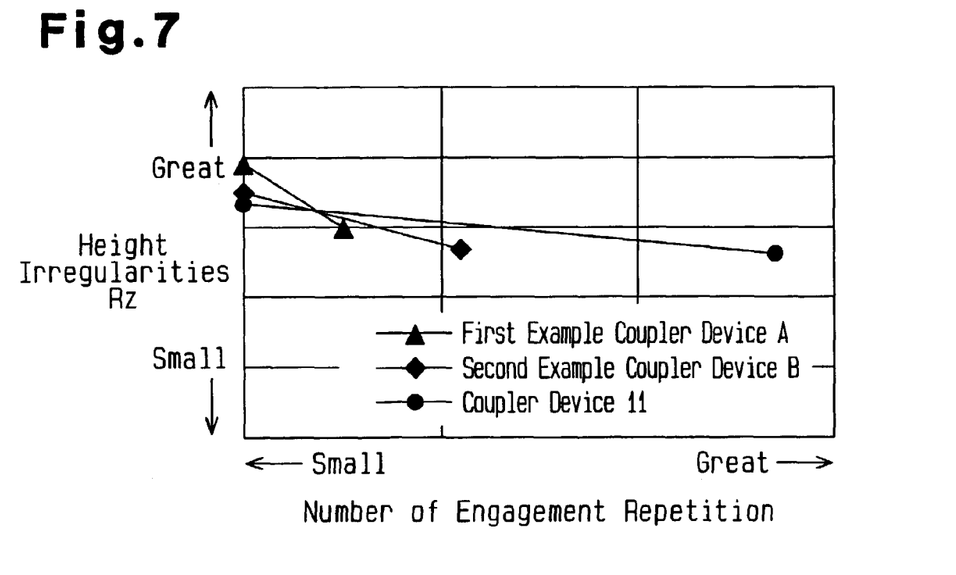
FIG. 7 is a graph showing the relationship between the number of engagement repetition and height irregularities Rz of the outer clutch plate according to the first embodiment.

FIG. 7 is a graph showing the relationship between the number of engagement repetition and height irregularities Rz in the outer clutch plates 34b of each of the coupling devices 11, A, and B. In the graph of FIG. 7, the vertical axis represents height irregularities Rz, and the horizontal axis represents the number of engagement repetition.

Rz means ten point height irregularities (ten points average height).

As obvious from the graph of FIG. 7, in the case of the coupling device 11, the rate of decrease of the height irregularities Rz to the number of engagement repetition is one fifth and two fifths of the corresponding rate of the first and second example coupling devices A, B, respectively. As a result, the outer clutch plates 34b of the coupling device 11 has a greater resistance to wear compared to the outer clutch plates 34b of the first and second example coupling devices A, B.

Figure 8:
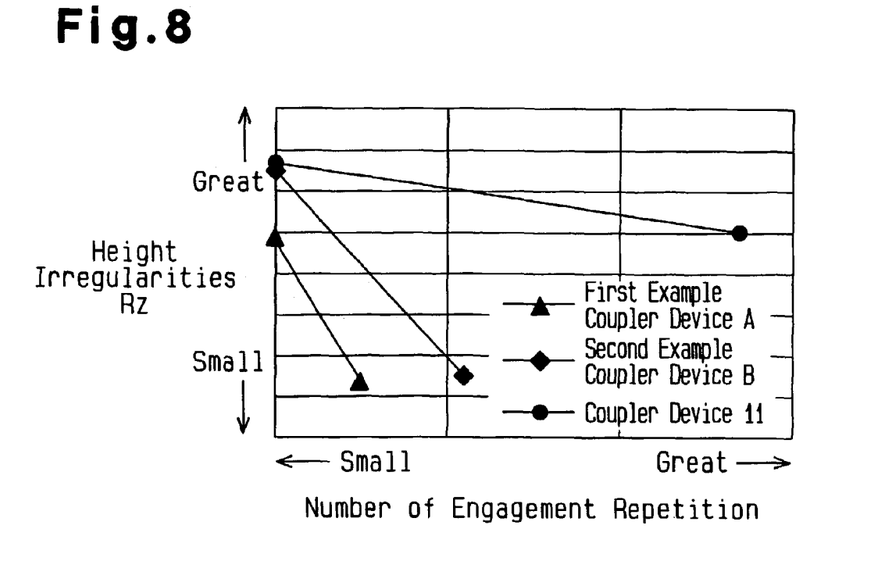
FIG. 8 is a graph showing the relationship between the number of engagement repetition and height irregularities Rz of the inner clutch plate according to the first embodiment.

FIG. 8 is a graph showing the relationship between the number of engagement repetition and height irregularities Rz in the inner clutch plates 34a of each of the coupling devices 11, A, and B. In the graph of FIG. 8, the vertical axis represents height irregularities Rz, and the horizontal axis represents the number of engagement repetition.

As obvious from the graph of FIG. 8, in the case of the coupling device 11, the rate of decrease of the height irregularities Rz to the number of engagement repetition is one seventh and one tenth of the corresponding rate of the first and second example coupling devices A, B, respectively. As a result, the inner clutch plate 34a of the coupling device 11 has a greater resistance to wear compared to the inner clutch plates 34a of the first and second example coupling devices A, B.

That is, the outer clutch plate 34b of this embodiment is less likely to be worn compared to the outer clutch plates of the first and second example coupling devices A, B. Also, since the inner clutch plate 34a of this embodiment slides on the DLC-Si films D, the clutch plate 34a is less likely to be worn compared to the inner clutch plates of the first and second example coupling devices A, B, which do not slide on the DLC-Si film D. This is because the DLC-Si film D functions as a solid lubricant to reduce the wear of the inner clutch plate 34a.

Therefore, this embodiment significantly extends the lifetime of the clutch plates 34a, 34b, and thereupon significantly extends the lifetime of the coupling device 11.

Figure 9:
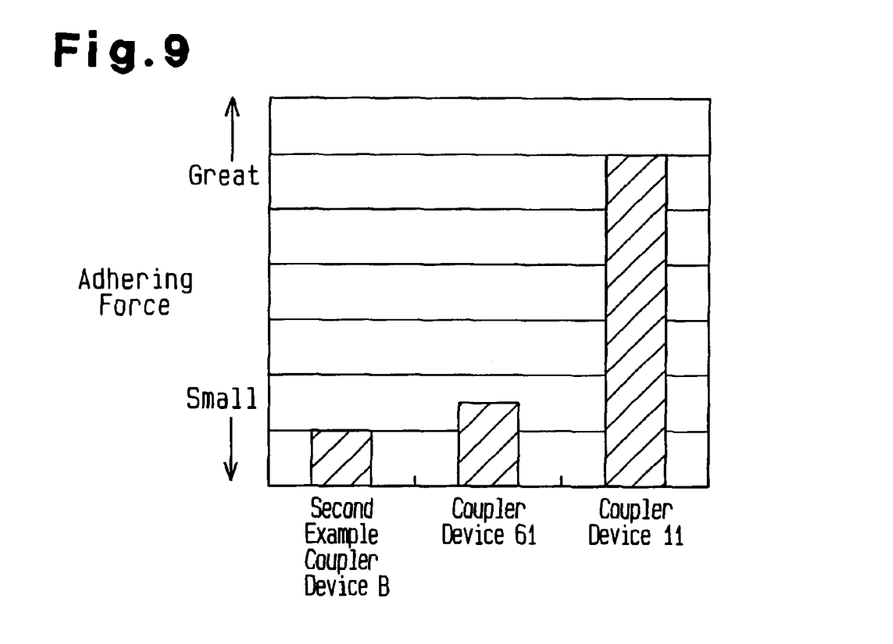
FIG. 9 is a graph showing the adhering force of a film to the outer clutch plates of the first and second embodiments.

FIG. 9 is a graph showing the adhering force of the DLC-Si film D to the sliding surface S2 of the coupling device 11 of this embodiment, and the adhering force of the diamond-like carbon film to the sliding surface S2 of the second example coupling device B. As obvious in the graph of FIG. 9, the adhering force of the DLC-Si film D in the coupling device 11 of this embodiment is six times higher than the adhering force of the diamond-like carbon film in the second example coupling device B. Therefore, the DLC-Si film D of the coupling device 11 is less likely to peel off compared to the diamond-like carbon film of the second example coupling device B.

The mesh-like grooves Mb formed on the sliding surface S2 of each outer clutch plate 34b allow the contacting area between the inner clutch plate 34a and the outer clutch plate 34b to be adjusted to an arbitrary value. The grooves Mb also receive excessive lubricant oil existing between adjacent clutch plates 34a, 34b to limit the formation of oil film. As a result, the sliding performance of the clutch plates 34a, 34b is improved. Also, the dragging torque is reduced and the durability of the friction clutch 34 is improved.

A second embodiment of the present invention will now be described with reference to FIGS. 6 and 9. The differences from the first embodiment of coupling device 11 will mainly be discussed. Like or the same reference numerals are given to those components that are like or the same as the corresponding components of the first embodiment of FIGS. 1 to 9.

The coupling device 61 of the second embodiment is different from the first embodiment in that the DLC-Si film D is formed after ion impact sputtering, but no nitrided layer T is formed on the sliding surface S2 of the outer clutch plate 34b. Except for this point, the device 61 of the second embodiment is identical to the device 11 of the first embodiment.

Next, the result of the comparison between the coupling device 61 and the first example coupling device A and the second example coupling device B of the first embodiment will be described. The torque transmission capacity of the example coupling devices A, B is the same as that of the coupling device 61.

As shown in FIG. 6, in the case of the coupling device 61 of this embodiment, if the number of engagement repetition exceeds a4, µ100/µ50 is less than one and the judder occurs. Therefore, in the coupling device 61 of this embodiment, the number of engagement repetition until judder occurs is 5 times and 1.5 times the corresponding number of engagement repetition of the coupling devices A, B, respectively.

As obvious in the graph of FIG. 9, the adhering force of the DLC-Si film D to the sliding surface S2 of the coupling device 61 is 1.5 times higher than the adhering force of the diamond-like carbon film to the sliding surface S2 of the second example coupling device B. Therefore, the DLC-Si film D of the coupling device 61 is less likely to peel off the sliding surface S2 compared to the diamond-like carbon film of the second example coupling device B.

As described above, a friction clutch that is resistant to wear and excellent in durability is obtained as in the first embodiment.

It should be apparent to those skilled in the art that the present invention may be embodied in many other specific forms without departing from the spirit or scope of the invention. Particularly, it should be understood that the invention may be embodied in the following forms.

In the first and second embodiments, the friction engagement in the friction clutch 34 is established with lubricant oil. However, the friction engagement may be established without lubricant oil.

In the first and second embodiments, the mesh-like grooves Ma, Mb are formed on the outer clutch plates 34b. However, the grooves Ma, Mb may be omitted.

In the first and second embodiments, the friction engagement of the friction clutch 34 is transmitted to the main clutch mechanism 30c through the cam mechanism 30e. Then, the main clutch mechanism 30c is friction engaged to permit torque to be transmitted between the outer case 30a and the inner shaft 30b. However, the cam mechanism 30e and the main clutch mechanism 30c may be omitted. In this case, the friction engagement of the friction clutch 34 permits torque to be transmitted between the outer case 30a and the inner shaft 30b.

In the first and second embodiments, the outer clutch plates 34b with the DLC-Si films D are used in the friction clutch 34. However, the DLC-Si film D may be formed on at least one of the clutch plates 32a, 32b of the main clutch mechanism 30c.

In the first and second embodiments, the DLC-SI films D are formed on the outer clutch plates 34b. However, the DLC-Si film, D may be formed on the inner clutch plate 34a. Alternatively, the DLC-Si film D may be formed only on the inner clutch plate 34a.

In the first and second embodiments, the outer clutch plates 34b are nitrided and covered with the DLC-Si films D, and the inner clutch plate 34a is nitrided or is subjected to quenching and tempering treatment. However, the outer clutch plates 34b may be nitrided or be subjected to quenching and tempering treatment, and the inner clutch plate 34a may be nitrided and covered with the DLC-Si film D.

The outer clutch plates 34b of the first and second embodiments, on which the DLC-Si films D are formed may be used in a clutch mechanism for automatic transmission.

In the first and second embodiments, the DLC-Si films D are formed on the iron outer clutch plates 34b. However, the material of the clutch plates on which the DLC-Si film D is formed may be a metal other than iron, ceramic, synthetic rubber, or synthetic resin.

Therefore, the present examples and embodiments are to be considered as illustrative and not restrictive and the invention is not to be limited to the details given herein, but may be modified within the scope and equivalence of the appended claims.

The invention claimed is:

1. A friction clutch exposed to lubricating oil, comprising:
a first clutch plate having a first sliding surface, wherein a diamond-like carbon film containing 36 wt % to 50 wt % of silicon is formed on a first sliding surface; and
a second clutch plate having a second sliding surface that contacts the first sliding surface, wherein the clutch plates friction-engage with each other in the lubricating oil to transmit torque.

2. The friction clutch according to claim 1, wherein the first and second clutch plates are made of iron.

3. The friction clutch according to claim 1, wherein the first sliding surface is subjected to ion impact sputtering.

4. The friction clutch according to claim 1, wherein the diamond-like carbon film has a thickness of 0.1 µm to 10 µm.

5. The friction clutch according to claim 1, wherein at least one of the first and second sliding surfaces includes a plurality of grooves that extend about a rotation axis of the associated clutch plate.

6. The friction clutch according to claim 1, wherein at least one of the first and second sliding surfaces includes grooves in a substantially net form.

7. The friction clutch according to claim 1, further comprising minute asperities on the first sliding surface, wherein said asperities improve a contact of the diamond-like carbon film onto the first sliding surface.

8. The friction clutch according to claim 1, wherein nitride treatment or quenching and tempering treatment is applied to the second sliding surface.

9. The friction clutch according to claim 1, wherein the diamond-like carbon film formed on the first sliding surface contains 40 wt % to 50 wt % of silicon.

10. The friction clutch according to claim 1, wherein the diamond-like carbon film formed on the first sliding surface contains 40 wt % of silicon.

11. A friction clutch exposed to lubricating oil, comprising:
a first clutch plate having a first sliding surface, wherein a diamond-like carbon film containing 36 wt % to 50 wt % of silicon is formed on a first sliding surface; and
a second clutch plate having a second sliding surface that contacts the first sliding surface, wherein the clutch plates friction-engage with each other in the lubricant oil to transmit torque,
wherein a nitrided layer is formed in the first clutch plate, and wherein the diamond-like carbon film is formed on the surface of the nitrided layer.

12. The friction clutch according to claim 11, wherein the surface of the nitrided layer is subjected to ion impact sputtering.

13. The friction clutch according to claim 11, further comprising minute asperities on the surface of the nitrided layer, wherein said asperities improve a contact of the diamond-like carbon film onto the nitrided layer.

14. A coupling device comprising:
a first rotary member;
a second rotary member, which is rotatable relative to the first rotary member;
a housing chamber defined between the first rotary member and the second rotary member, the housing chamber being filled with lubricant oil; and
a plurality of clutches located in the housing chamber, wherein the clutches cooperate to transmit torque between the first rotary member and the second rotary member, wherein at least one of the clutches is a friction clutch having a first clutch plate and a second clutch plate, wherein the clutch plates friction-engage with each other in the lubricant oil, wherein the first clutch plate has a first sliding surface that contacts the second clutch plate, wherein the second clutch plate has a second sliding surface that contacts the first clutch plate, and wherein a diamond-like carbon film containing 36 wt % to 50 wt % of silicon is formed on the first sliding surface.

15. The coupling device according to claim 14, wherein the clutches include a first clutch and a second clutch, wherein at least one of the first and second clutches is the friction clutch, wherein the second clutch is located between the rotary members, wherein torque is transmitted between the rotary members through the second clutch, wherein the coupling device further includes an electromagnetic actuator for driving the first clutch, wherein, when the electromagnetic actuator actuates the first clutch, the second clutch transmits torque between the rotary members in response to the actuation of the first clutch.

16. The coupling device according to claim 14, further comprising an electromagnetic actuator, which actuates the friction clutch such that the clutch plates friction-engage with each other, wherein the friction clutch and the electromagnetic actuator form a pilot clutch mechanism, wherein the clutches include a main clutch located between the rotary members, torque being transmitted between the rotary members through the main clutch, wherein a cam mechanism is located between the pilot clutch mechanism and the main clutch and wherein the cam mechanism actuates the main clutch in response to motion of the pilot clutch mechanism.

17. The coupling device according to claim 14, wherein the first sliding surface is subjected to ion impact sputtering.

18. The coupling device according to claim 14, wherein the diamond-like carbon film has a thickness of 0.1 μm to 10 μm.

19. The coupling device according to claim 14, wherein at least one of the first and second sliding surfaces includes grooves in a substantially net form.

20. The coupling device according to claim 14, wherein nitride treatment or quenching and tempering treatment is applied to the second sliding surface.

21. The coupling device according to claim 14, wherein the diamond-like carbon film formed on the first sliding surface contains 40 wt % to 50 wt % of silicon.

22. The coupling device according to claim 14, wherein the diamond-like carbon film formed on the first sliding surface contains 40 wt % of silicon.

23. A coupling device comprising:
a first rotary member;
a second rotary member, which is rotatable relative to the first rotary member;
a housing chamber defined between the first rotary member and the second rotary member, the housing chamber being filled with lubricant oil; and
a plurality of clutches located in the housing chamber, wherein the clutches cooperate to transmit torque between the first rotary member and the second rotary member, wherein at least one of the clutches is a friction clutch having a first clutch plate and a second clutch plate, wherein the clutch plates friction-engage with each other in the lubricant oil, wherein the first clutch plate has a first sliding surface that contacts the second clutch plate, wherein the second clutch plate has a second sliding surface that contacts the first clutch plate, and wherein a diamond-like carbon film containing 36 wt % to 50 wt % of silicon is formed on the first sliding surface,
wherein a nitrided layer is formed in the first clutch plate, and wherein the diamond-like carbon film is formed on the surface of the nitrided layer.

24. The coupling device according to claim 23, wherein the surface of the nitrided layer is subjected to ion impact sputtering.

* * * * *